United States Patent
Komoda et al.

[11] Patent Number: 6,166,477
[45] Date of Patent: Dec. 26, 2000

[54] ULTRASONIC MOTOR WITH ROTOR CONVERTING LONGITUDINAL VIBRATIONS INTO TORQUE

[75] Inventors: Masahiko Komoda, Toyokawa; Toshiaki Miyamoto, Toyohashi; Kazumasa Kubota, Toyohashi; Motoyasu Yano, Toyohashi, all of Japan

[73] Assignee: Asmo Co., Ltd., Kosai, Japan

[21] Appl. No.: 09/056,594

[22] Filed: Apr. 7, 1998

[30] Foreign Application Priority Data

| Apr. 7, 1997 | [JP] | Japan | 9-103851 |
| Jul. 25, 1997 | [JP] | Japan | 9-199986 |

[51] Int. Cl.[7] .................................................. H02N 2/00
[52] U.S. Cl. .............................. 310/323.13; 310/323.12
[58] Field of Search ............................... 310/333, 328, 310/323.02, 323.03, 323.12, 323.13, 323.17

[56] References Cited

U.S. PATENT DOCUMENTS

| 4,019,073 | 4/1977 | Vishnevsky et al. | 310/333 |
| 4,210,837 | 7/1980 | Vasiliev et al. | 310/323 |
| 4,947,076 | 8/1990 | Kumada | 310/323 |
| 4,983,874 | 1/1991 | Yamaguchi | 310/323 |
| 5,233,257 | 8/1993 | Luthier et al. | 310/323 |
| 5,247,220 | 9/1993 | Miyazawa et al. | 310/323 |
| 5,521,455 | 5/1996 | Miyazawa et al. | 310/323 |
| 6,018,213 | 1/2000 | Yano | 310/323.12 |

FOREIGN PATENT DOCUMENTS

| 61-49670 | 3/1986 | Japan | H02N 2/00 |
| 63-217984 | 9/1988 | Japan | H02N 2/00 |
| 6-165536 | 6/1994 | Japan | 310/323 |
| 7-75353 | 3/1995 | Japan | H02N 2/00 |
| 2 044 014 | 10/1980 | United Kingdom | 310/323 |
| 2 044 015 | 10/1980 | United Kingdom | 310/323 |

*Primary Examiner*—Thomas M. Dougherty
*Attorney, Agent, or Firm*—Fish & Richardson P.C.

[57] ABSTRACT

An ultrasonic motor having a stator in which at least a longitudinal vibration is generated and a rotor rotatably mounted on the stator. Slanted slits are formed on the cylindrical surface of the rotor, which convert a part of the longitudinal vibration in the stator into a twisting vibration that gives the rotor a rotational force. The slits are slanted to the rotational direction of the rotor. The rotor is rotated at a higher speed because of the slits. The form of the slits may be selectively varied according to desired characteristics of the ultrasonic motor.

25 Claims, 9 Drawing Sheets

ULTRASONIC MOTOR WITH ROTOR CONVERTING LONGITUDINAL VIBRATIONS INTO TORQUE

BACKGROUND OF THE INVENTION

1. Field of the Invention

The present invention relates to an ultrasonic motor, and more particularly to its rotor structure.

2. Description of Related Art

Figure 10A:
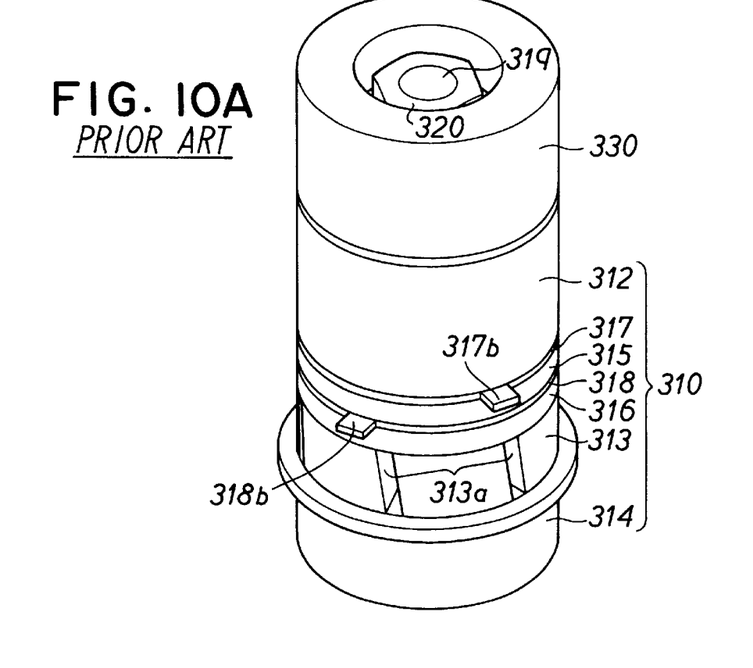
FIG. 10A is a perspective view showing an example of a conventional ultrasonic motor.

An ultrasonic motor using standing wave has been known hitherto. An example of this kind of ultrasonic motor is shown in FIG. 10A. The motor is composed of stator 310 and rotor 330 which rotates relative to the stator. Stator 310 includes first block 312, first electrode plate 317, first piezoelectric element 315, second electrode plate 318, second piezoelectric element 316, and second block 314, all of these elements being assembled into a single body with through-bolt 319 and nut 320 as shown in FIG. 10A. Rotor 330 is rotatably assembled on the top of stator 310 with the same through-bolt 319 and nut 320. On second block 314, plural slanted slits 313*a* are formed.

Figure 10B:
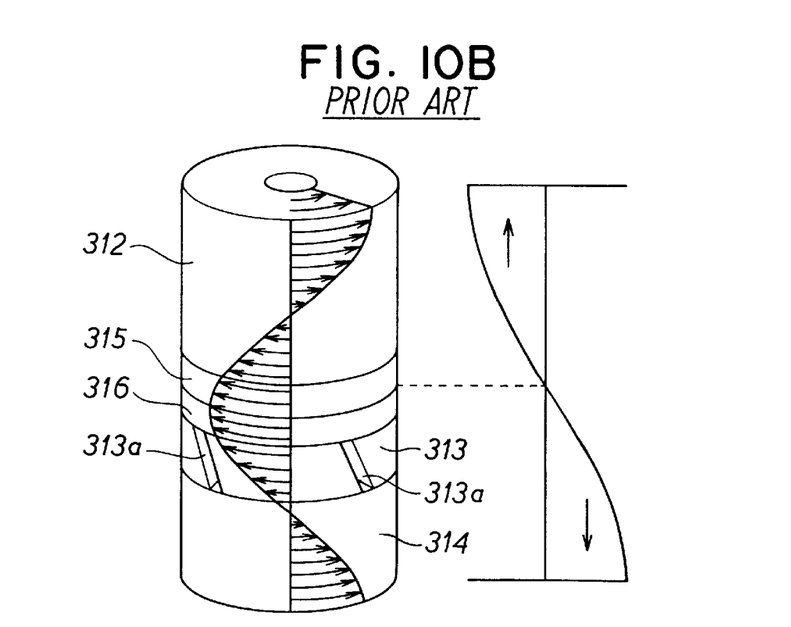
FIG. 10B is a schematic view showing vibrations generated in the stator of the conventional ultrasonic motor shown in FIG. 10A.

High frequency voltage is imposed on both piezoelectric elements 315, 316. The voltage is imposed on first piezoelectric element 315 from terminals 317*b*, 318*b* connected to both electrode plates 317, 318, respectively. The voltage is imposed on second piezoelectric element 316 from terminal 318*b* and the lower surface of second piezoelectric element 316 which is electrically connected to terminal 317*b* through bolt 319. Both piezoelectric elements 315, 316 generate longitudinal vibration which is transmitted to both blocks 312, 314. The longitudinal vibration transmitted to second block 314 generates twisting vibration as a function of slanted slits 313*a* formed on upper part 313 of second block 314. The longitudinal and twisting vibrations are combined in stator 310 forming ellipse vibration on the upper surface of rotor 330 on which rotor 330 is rotatably mounted. Rotor 330 is rotated by the combined vibration of stator,310. Some more details of the combined vibration in stator 310 are schematically shown in FIG. 10B. The twisting vibration is shown by arrows in the left and the longitudinal vibration is shown in the right. The longitudinal vibration gives the rotor a lifting force, while the twisting vibration gives the rotor a rotating force.

There is a problem in the conventional ultrasonic motor in that obtaining a sufficient rotational speed of the rotor is difficult since the twisting vibration converted from the longitudinal vibration is not sufficiently large. Moreover, the twisting vibration tends to vary according to conditions of fastening the elements of the stator including the fastening strength.

SUMMARY OF THE INVENTION

The present invention has been made in view of the above-mentioned problems, and an object of the present invention is to provide an ultrasonic motor in which its rotor rotates at a sufficiently high speed, and more particularly to provide a structure of the rotor so that longitudinal vibration in the stator can be converted into twisting vibration by the rotor itself. Another object of the present invention is to provide an ultrasonic motor, the rotational speed of which does not depends on the fastening conditions of stator elements.

According to the present invention, plural slits which are slanted to the rotational direction of the rotor are formed on the outer surface of the rotor. The slits convert a part of the longitudinal vibration generated in the stator into the twisting vibration which rotates the rotor relative to the stator. The longitudinal vibration gives the rotor a lifting force from the stator. Because of the slanted slits formed on the rotor, the rotor can rotate at a higher speed than that of conventional ultrasonic motors.

The form of the slanted slits may be selectively varied according to required characteristics of the motor. The slits may be made throughout the whole height of the rotor, only on the upper half part of the rotor or only the lower half part of the rotor. Also, the slits may be made only on the middle part of the rotor. Both side walls of the slits may be parallel to each other, or one wall may be perpendicular to the lower surface of the rotor while the other wall may be slanted to the rotational direction.

The slits formed on the rotor surface may not be slanted when the stator generates both the twisting and longitudinal vibrations. It is also possible to form plural contacting pieces on the lower surface of the rotor in place of the slits so that the contacting pieces slidably contact the stator. The contacting pieces convert the longitudinal vibration in the stator into the twisting vibration which rotates the rotor relative to the stator. Preferably, the contacting pieces are slanted, viewed from the stator, to the rotational direction of the rotor. The contacting pieces may not be slanted in case a stator which generates both the longitudinal and twisting vibrations is used.

A lining which facilitates a smooth rotation of the rotor is interposed between the stator and the rotor. The lining may be attached to the lower surface of the rotor or to the upper surface of the stator. Preferably, all the components constituting the stator and the rotor are assembled with a single through-bolt, so that the rotor is pressed down toward the stator with a predetermined longitudinal force and smoothly rotates relative to the stator. In case the stator in which only the longitudinal vibration is generated is used in combination with the rotor having slits, a force combining components of the stator does not have to be strictly controlled because there is no twisting vibration in the stator to be combined with the longitudinal vibration.

Other objects and features of the present invention will become more readily apparent from a better understanding of the preferred embodiments described below with reference to the following drawings.

DETAILED DESCRIPTION OF THE PREFERRED EMBODIMENTS

Figure 1:
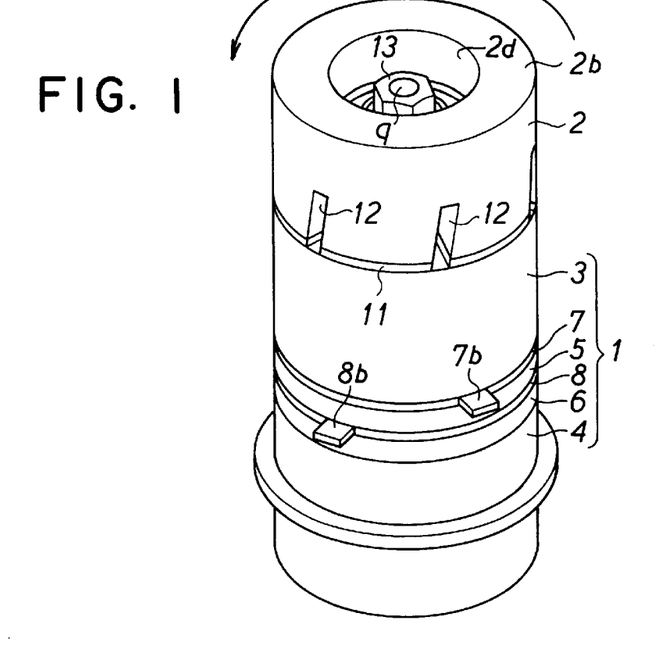
FIG. 1 is a perspective view showing a whole structure of an ultrasonic motor as a first embodiment of the present invention.
Figure 2:
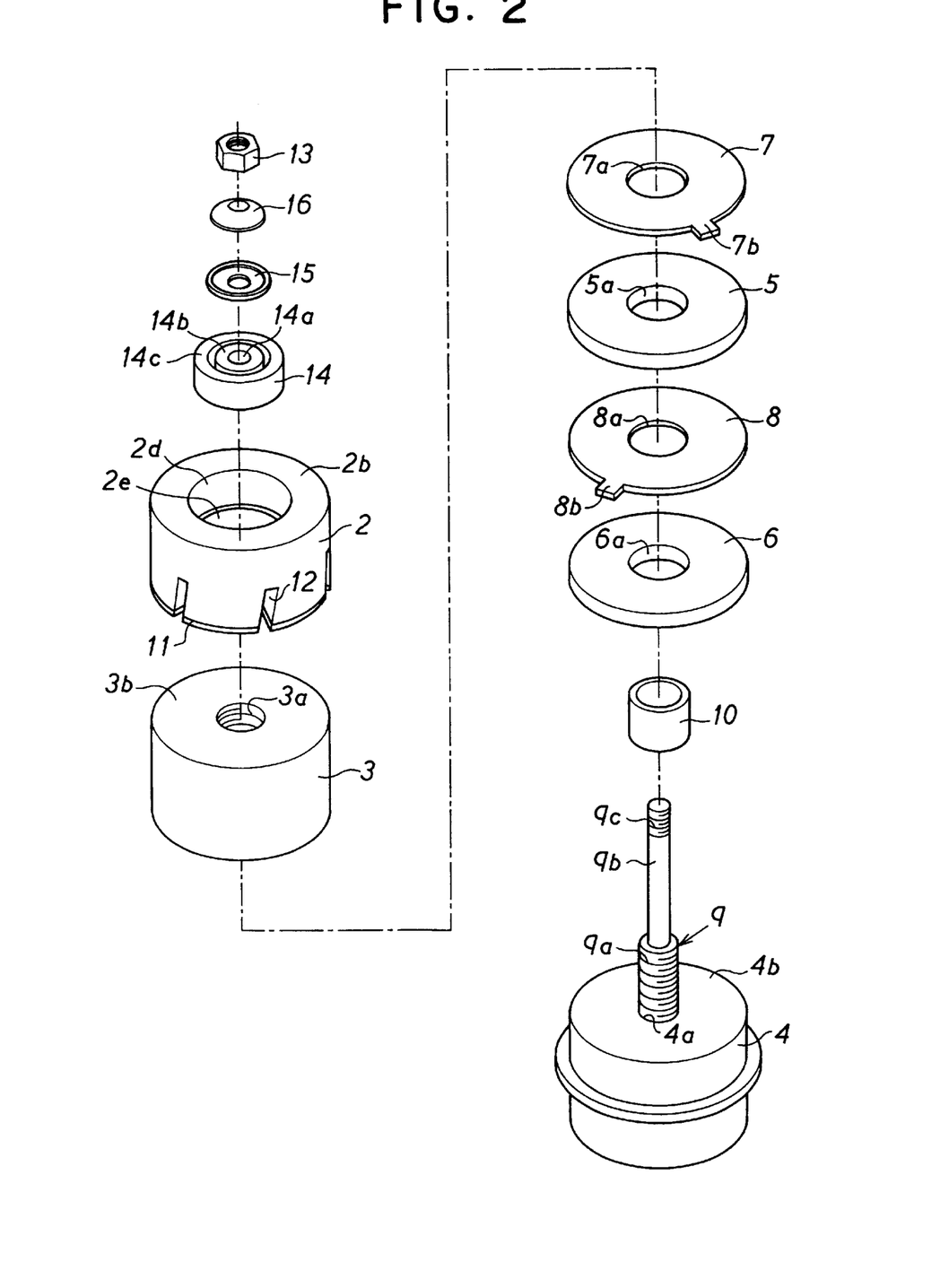
FIG. 2 is a perspective view showing all elements of the ultrasonic motor shown in FIG. 1, the elements being separated from one another.

Referring to FIGS. 1 to 4, an ultrasonic motor as a first embodiment of the present invention will be described. FIG. 1 shows a perspective view of a whole structure, FIG. 2 a perspective view of disassembled elements of the motor, FIG. 3A a cross-sectional view of the motor shown in FIG. 1, FIG. 3B a plan view of the lower surface of a rotor, and FIG. 4 a graph for comparing characteristics of the motor of the present invention and a conventional one. The structure of the motor will be described mainly referring to FIG. 3A, making reference to other drawings when needed.

Figure 3A:
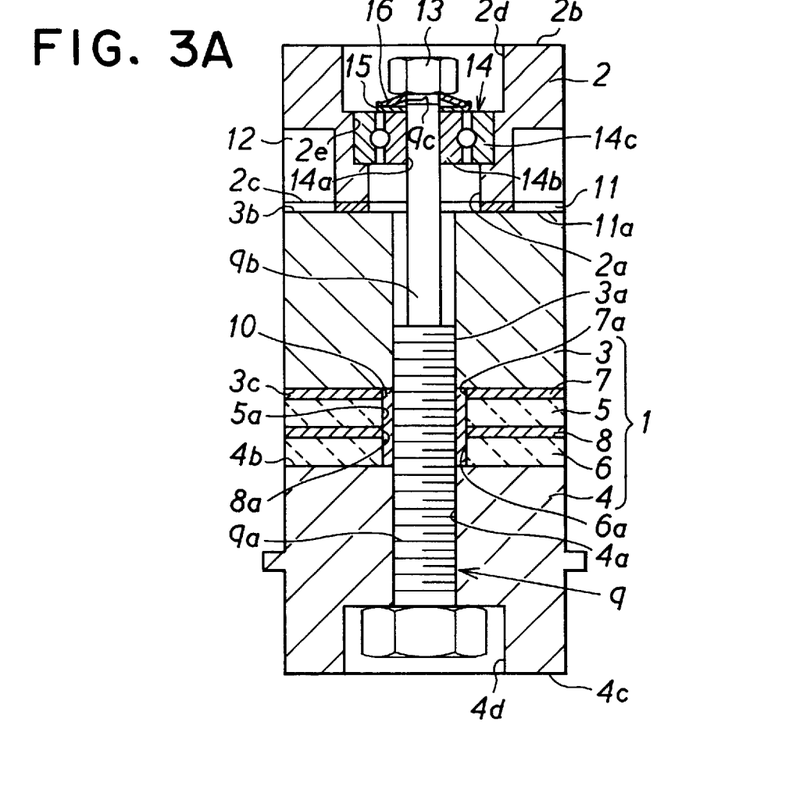
FIG. 3A is a cross-sectional view showing the ultrasonic motor shown in FIG. 1.

The ultrasonic motor consists of stator 1 and rotor 2 which rotates relative to stator 1. Stator 1 is composed of the following elements, from its top to bottom in the drawing: cylindrical first block 3, disc-shaped first electrode plate 7, disc-shaped first piezoelectric element 5, disc-shaped second electrode plate 8, disc-shaped second piezoelectric element 6, and cylindrical second block 4. First block 3 is made of an electric conductive material such as an aluminum alloy and has threaded center hole 3a, upper surface 3b and lower surface 3c. Second block 4 is also made of an electric conductive material such as an aluminum alloy and has threaded center hole 4a, upper surface 4b, lower surface 4c and depressed space 4d at its lower end. Between both blocks 3 and 4, first electrode plate 7, first piezoelectric element 5, second electrode plate 8 and second piezoelectric element 6 are sandwiched in this order. Both piezoelectric elements 5, 6 are disc-shaped and have center holes 5a, 6a, respectively. One of the piezoelectric elements 5, 6 is configured to have an opposite polarization direction from the other with respect to the longitudinal axis of the stator. First and second electrode plates 7, 8 are disc-shaped and have respective center holes 7a, 8a. First electrode plate 7 has terminal 7b from which high frequency voltage is supplied. Second electrode plate 8 also has terminal 8b from which high frequency voltage is supplied (shown in FIG. 1). The high frequency voltage to operate the ultrasonic motor is imposed on first piezoelectric element 5 from first and second electrode plates 7, 8, and on second piezoelectric element 6 from second electrode plate 8 and upper surface 4b of second block 4 which is electrically connected to first electrode 7 via first block 3 and through-bolt 9.

First and second blocks 3, 4 are connected together by through-bolt 9 having thread 9a, sandwiching both electrode plates 7, 8 and both piezoelectric elements 5, 6 therebetween. Insulator pipe 10 is inserted in the center holes 5a, 6a, 7a, 8a of piezoelectric elements 5, 6 and the electrode plates 7, 8 for insulating those elements from through-bolt 9. In other words, through-bolt 9 having thread 9a is screwed into threaded center holes 3a, 4a of piezoelectric elements 3, 4, thereby connecting all elements constituting stator 1 together. Through-bolt 9 includes small diameter portion 9b sticking out of upper surface 3b of stator 1. At the top end of small diameter portion 9b, thread 9c is formed. Rotor 2 is placed on upper surface 3b of stator 1 and rotatably mounted on stator 1.

Figure 3B:
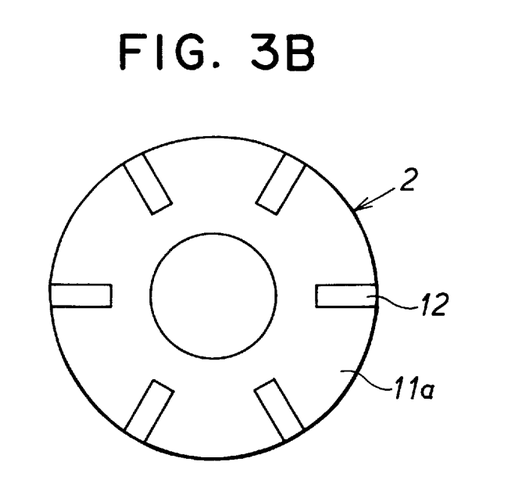
FIG. 3B is a plan view showing a lower surface of a rotor used in the ultrasonic motor shown in FIG. 3A.

Rotor 2 is made of stainless steel and has a cylindrical shape having center hole 2a, upper surface 2b and lower surface 2c. First depressed space 2d and second depressed space 2e are formed in rotor 2, first depressed space 2d having a little larger diameter than second depressed space 2e. On lower surface 2c of rotor 2, lining 11 is disposed. Lower surface 11a of lining 11 slidably contacts upper surface 3b of stator 1. Plural slits 12 are formed on the lower part of rotor 2 with equal intervals as shown in FIG. 3B. Each slit 12 is slanted toward the rotational direction of the rotor from its bottom end as shown in FIG. 1. The height of each slit 12 is about a half of the height of the rotor. Slits 12 convert the longitudinal vibration generated in the stator to the twisting vibration. In second depressed space 2e, bearing 14 having inner lace 14b and outer lace 14c is disposed. Inner bore 14a of bearing 14 tightly receives small diameter portion 9b of through bolt 9 therein, and an outer surface of bearing 14 is tightly held in second depressed space 2e. On inner lace 14b, dish 15 for receiving spring 16 is placed. Nut 13 is screwed to thread 9c of through-bolt 9, thereby rotatably mounting rotor 2 on stator 1.

The ultrasonic motor having the structure described above operates as follows. High frequency voltage to drive the motor is imposed on both piezoelectric elements 5, 6, with opposite polarity to each of the elements. This is because second electrode plate 8 is common to both elements 5, 6, and first electrode plate 7 and upper surface 4b have the same polarity. Also, polarization of both piezoelectric elements 5, 6 is opposite to each other as mentioned above. Therefore, upon imposing the high frequency voltage on both piezoelectric elements 5, 6, both elements expand or shrink at the same time in the longitudinal direction of the stator according to the polarity of the voltage imposed. In other words, the expansion or shrinkage of one piezoelectric element is added to that of the other element. The longitudinal expansion and shrinkage of piezoelectric elements 5, 6 generate longitudinal vibration in the stator. The longitudinal vibration in the stator is transmitted to the rotor which in turn converts it to the twisting vibration as a function of plural slits 12 formed on the rotor. The longitudinal vibration in the stator gives the rotor a lifting force, and the twisting vibration gives the rotor a rotational torque. Thus, the rotor is rotated relative to the stator in the direction of arrows shown in FIG. 1.

Figure 4:
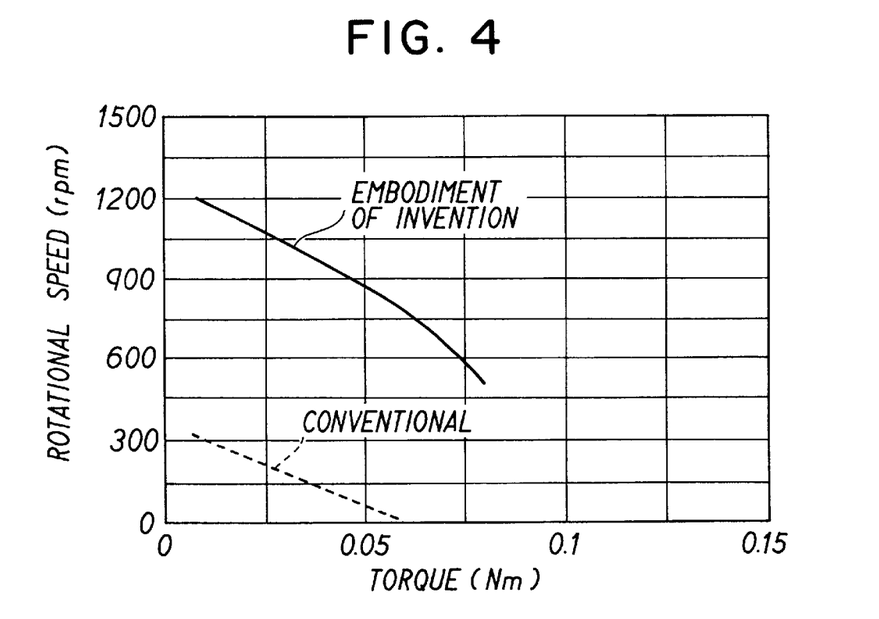
FIG. 4 is a graph showing a torque versus rotational speed characteristic of the ultrasonic motor, in comparison with a conventional one.

FIG. 4 shows a torque versus rotational speed characteristic of the ultrasonic motor of the present invention in comparison with a conventional ultrasonic motor. The motor torque in Newton-meter is shown on the abscissa and the rotational speed in rpm is shown on the ordinate. As seen from the graph, the rotational speed of the motor according to the present invention is about four times higher in the almost whole range of the rotor torque than that of a conventional one.

Figure 5A:
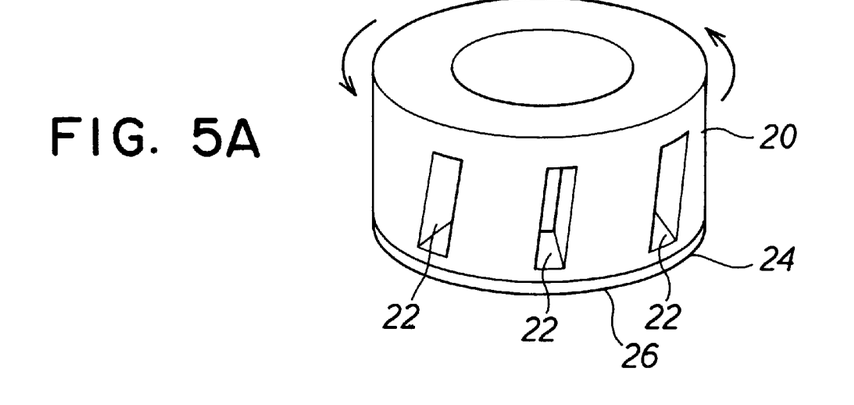
FIGS. 5A to 5I are perspective views each showing a variation of the rotor used in the ultrasonic motor of the present invention.
Figure 5B:
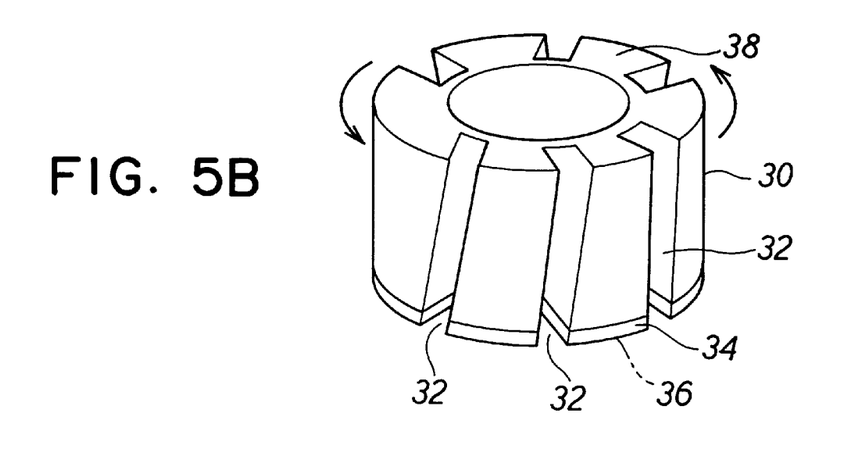
Figure 5C:
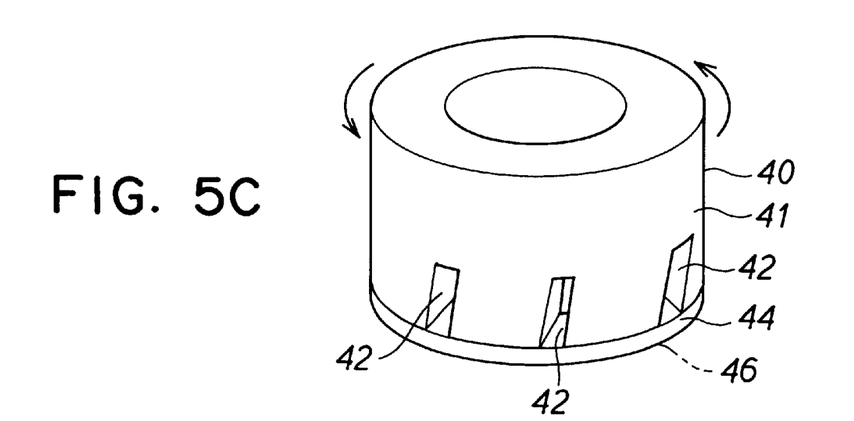

The rotor structure can be modified in various forms according to the present invention, not being limited to the structure mentioned above. Various modifications are shown in FIGS. 5A to 5I. Rotor 20 shown in FIG. 5A has slits 22 and lining 24 having lower surface 26 which slidably contacts the stator. Slits 22 in this modification are formed on the cylindrical surface of rotor 20 in the same manner as in rotor 2 described above, but the lower ends of slits do not reach the lower surface of rotor 20. In other words, slits 22 are formed on a middle part of rotor 20. Rotor 30 shown in FIG. 5B has slits 32 and lining 34 having lower surface 36. Slits 32 in this modification are formed all through the entire height of rotor 30 up to upper surface 38. Slits 32 can be formed more easily, compared with the slits which go through an entire height of the rotor. FIG. 5C shows another modification of the rotor. In this modification, rotor 40 has slits 42 and lining 44 having lower surface 46 which slidably contacts the upper surface of the stator. Slits 42 do not cut through lining 44, instead, lining 44 is attached to the rotor after slits 42 are formed on rotor 40.

Figure 5D:
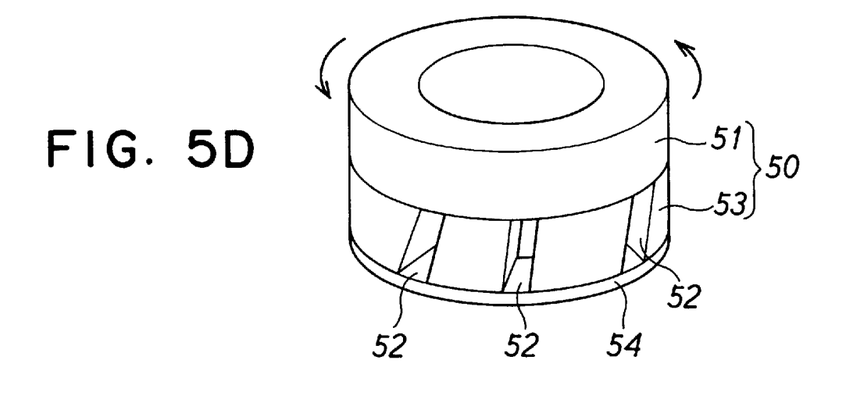
Figure 5E:
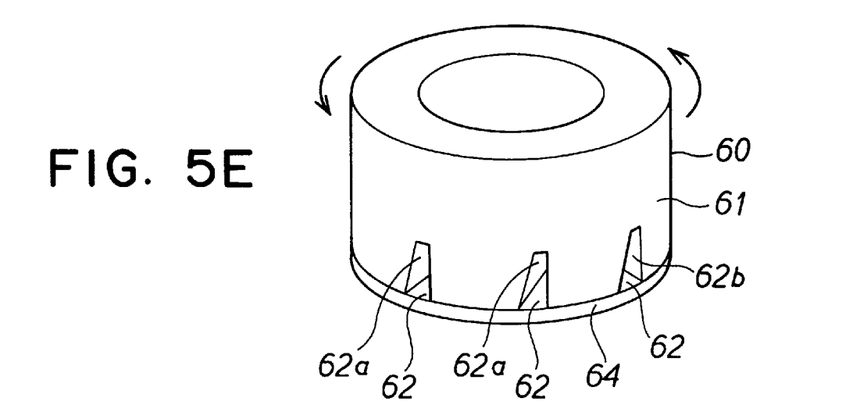

FIG. 5D shows another modified form of the rotor. In this modification, rotor 50 consists of first block 51, second block 53 connected to first block 51 and lining 54. On the cylindrical surface of second block 53, slits 52 are formed so that they cut through an entire height of second block 53. After slits 52 are formed on second block 53, first block 51 is connected to second block 53, and lining 54 is attached to the lower surface of second block 53. FIG. 5E shows modified rotor 60 which has slits 62 formed on a single block 61 and lining 64. Slits 62 have a different shape from those of all the slits described above. One side of each slit 62 is perpendicular to the lower surface of rotor 60, while the other side 62*a* is slanted toward the rotational direction of the rotor from the lower surface thereof, thereby making the sides non parallel. Lining 64 is attached to the lower surface of rotor 60 after slits 62 are formed. Rotor 60 having slits 62 may be made in a process of forging, sintering or diecasting.

Figure 5F:
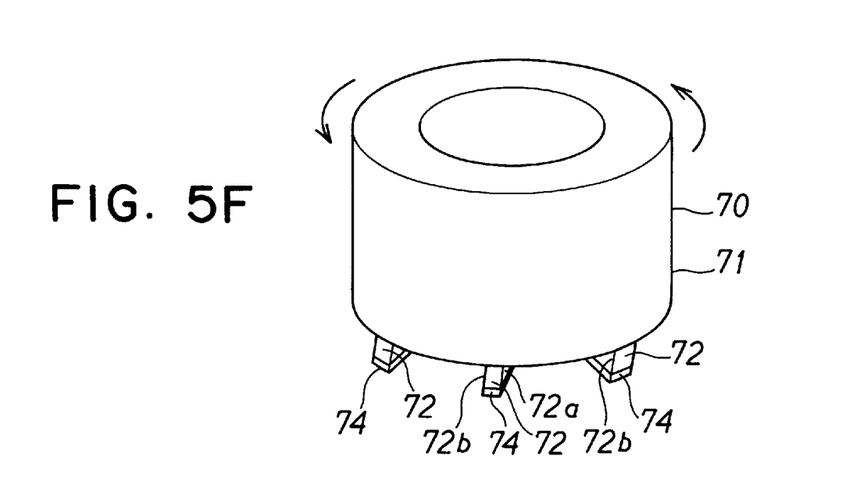
Figure 5G:
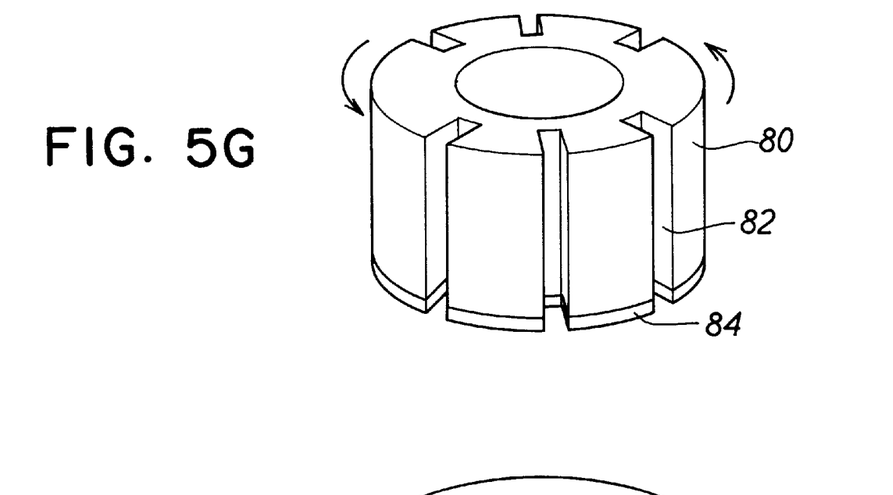

FIG. 5F shows a modified rotor 70 which has contacting pieces 72 formed on lower surface 71 of rotor 70 in place of the slits described above. On the bottom surface of each contacting piece 72, lining 74 is disposed so that rotor 70 slidably contacts the upper surface of the stator. Each contacting piece 72 has slanted sides 72*a*, 72*b*, both being formed in parallel to each other and slanting toward the rotational direction of rotor 70. Contacting pieces 72 can also generate the twisting vibration converted from the longitudinal vibration in the stator. FIG. 5G shows modified rotor 80 which has slits 82 and lining 84. Slits 82 are not slanted as opposed to other slits described above. Slits 82 are formed on the cylindrical surface of rotor 80 so that they cut through an entire height of rotor 80 including lining 84 in parallel to the longitudinal axis of rotor 80. Parallel slits like this also generates the twisting vibration.

Figure 5H:
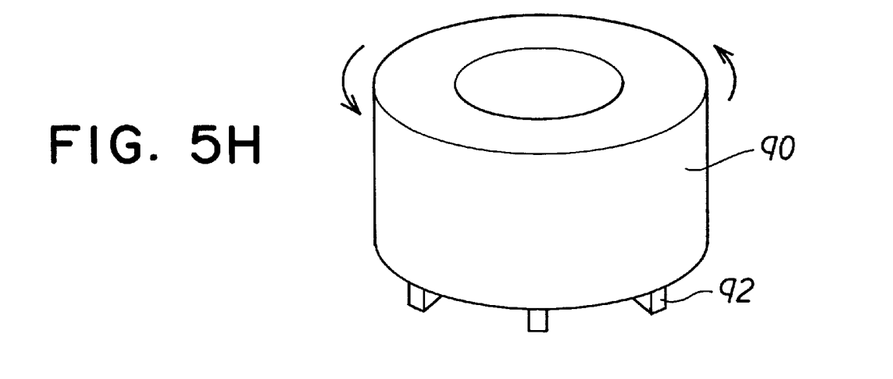
Figure 5I:
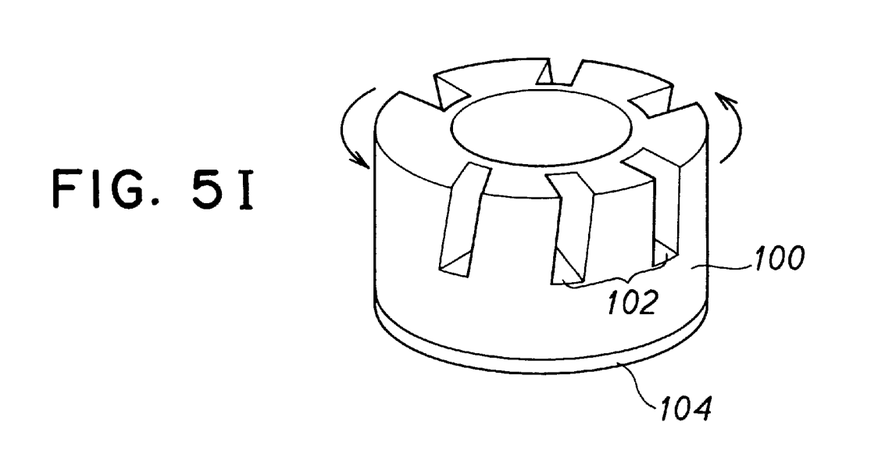

FIG. 5H shows modified rotor 90 which has contacting pieces 92 formed on the lower surface of rotor 90. Each contacting piece 92 is in parallel to the longitudinal axis of rotor 90. Parallel contacting pieces like this also generate the twisting vibration. FIG. 5I shows a modified rotor 100 which has slanted slits 102 and lining 104. Slits 102 are slanted in the same manner as other slanted slits described above, but they are formed on the upper part of rotor 100.

Since slits generating the twisting vibration converted from the longitudinal vibration in the stator are formed on the rotor according to the present invention, the rotor rotates at a higher speed than the conventional rotor which has no slits on its rotor. It is possible, as in the first embodiment shown in FIG. 1, to use the stator which generates only the longitudinal vibration, because the rotor of the present invention generates the twisting vibration by itself, converting the longitudinal vibration in the stator. Moreover, when the stator which generates no twisting vibration is used, it is not necessary to strictly control fastening conditions in an assembling process of the stator to stabilize an amount of the twisting vibration. Further, various rotors having different torque-speed characteristics can be selectively used combined with the same stator in an ultrasonic motor. Therefore, ultrasonic motors having various characteristics can be supplied at a low cost.

Figure 6:
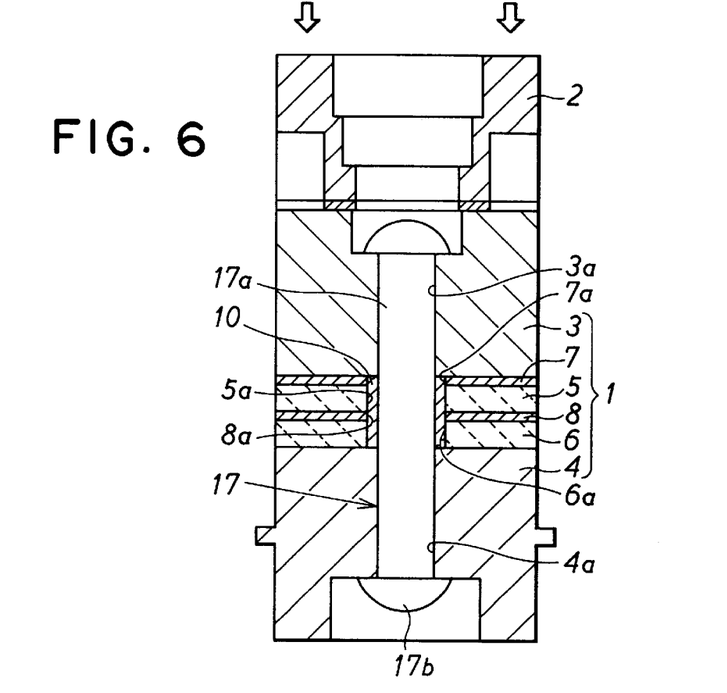
FIG. 6 is a cross-sectional view showing a modified structure, a fastening structure in particular, of the ultrasonic motor of the present invention.

The fastening or assembling structure of the stator components in the first embodiment may be modified in other forms. An example of such a modification is shown in to FIG. 6. In this modification, rivet 17 having head 17*b* and shaft 17*a* is used in place of through-bolt 9 shown in FIG. 3A. Rivet 17 is inserted into center holes of the stator components from either side thereof, and one end of rivet 17 opposite to head 17*b* is caulked or staked, making all the stator components into a single body as stator 1. Rotor 2 is placed on the top of stator 1 and kept in place by any other device which is suitable.

Figure 7A:
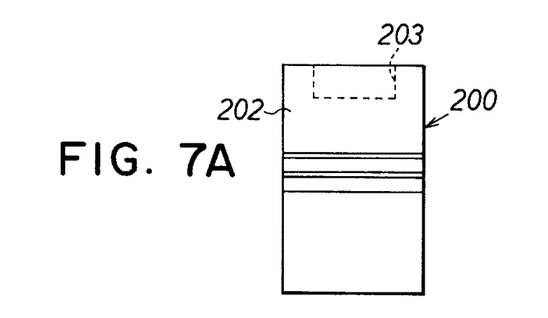
FIGS. 7A to 7D are front views each showing a modified form of the stator used in the ultrasonic motor of the present invention.
Figure 7B:
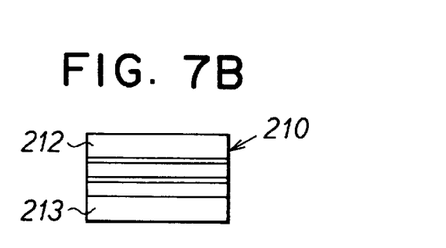
Figure 7C:
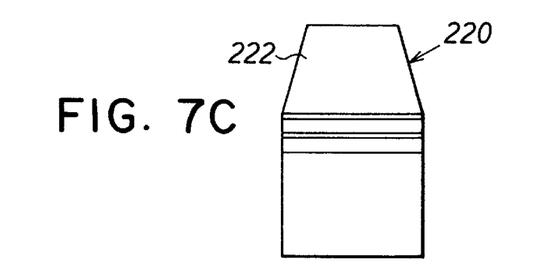
Figure 7D:
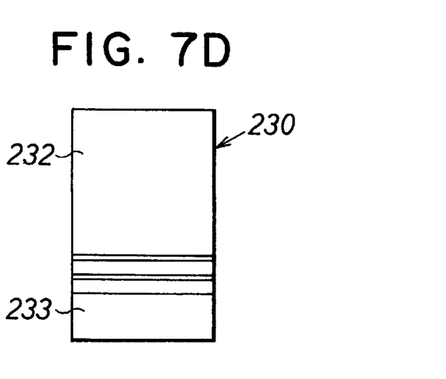

The structure of the stator of the first embodiment may also be modified in various forms. Some examples are shown in FIGS. 7A to 7D. FIG. 7A shows modified stator 200 in which depressed space 203 is formed on the top portion of first block 202. Depressed space 203 helps effective transmission of the vibration generated in the stator to the rotor. FIG. 7B shows modified stator 210 in which the longitudinal height of first block 212 and second block 213 is shortened. This structure may be applied to a small size ultrasonic motor. FIG. 7C shows modified stator 220 in which the shape of first block 222 is modified. First block 222 is tapered toward its upper surface. The tapered block is suitable to an ultrasonic motor having a smaller rotor and improves transmission efficiency of the vibration generated in the stator. FIG. 7D shows modified stator 230 in which first block 232 is longer than second block 233.

Figure 8:
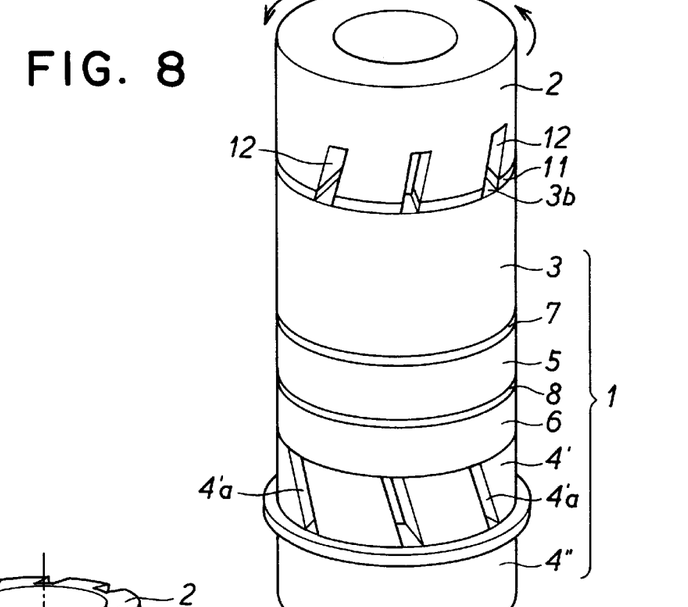
FIG. 8 is a perspective view showing a whole structure of an ultrasonic motor as a second embodiment of the present invention.

A second embodiment of the present invention is shown in FIG. 8. The second embodiment differs from the first embodiment shown in FIG. 1 only in the structure of the second block of the stator. Therefore, numerals assigned to denote the same components or parts are the same in both FIG. 1 and FIG. 8. In the second embodiment, second block 4 is divided into upper part 4' and lower part 4". The upper part 4' has slanted slits 4'*a* which are slanted in the direction opposite to that of slanted slits 12 of rotor 2. Silts 4'*a* convert a part of the longitudinal vibration generated in stator 1 to the twisted vibration. Therefore, both the longitudinal and twisting vibrations are generated in stator 1 of the second embodiment. Rotor 2 is the same as that used in the first embodiment, and various modified forms of the rotor described above are also applicable to the second embodiment. The second embodiment operates in the same manner as the first embodiment.

Figure 9:
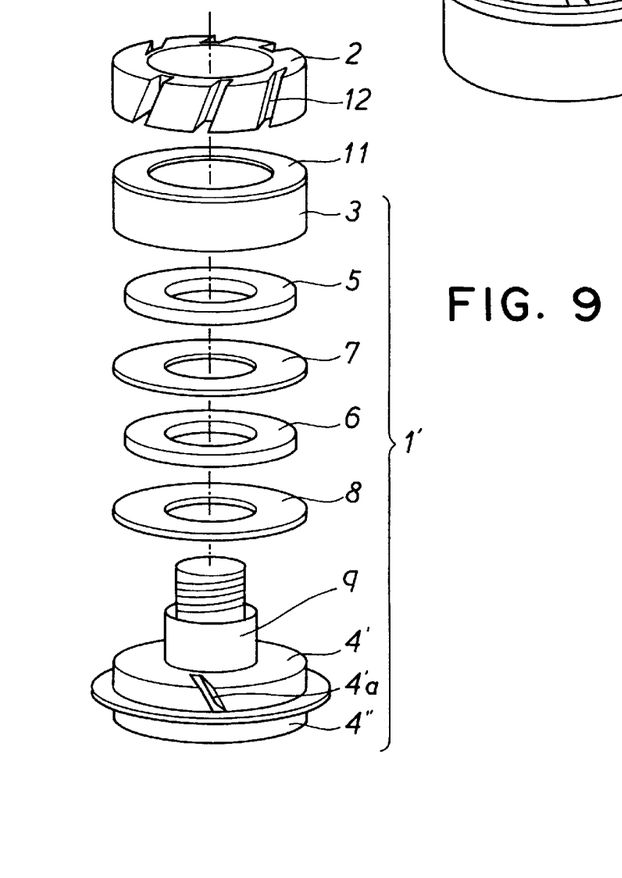
FIG. 9 is a perspective view showing a modified structure of the ultrasonic motor of the present invention, elements being separated from one another.

FIG. 9 shows an ultrasonic motor structure slightly modified from the first and second embodiments. In this modification, lining 11 is not attached to the lower surface of rotor 2, instead, it is attached to the upper surface of first block 3 of stator 1'. Also, the order of laminating a pair of electrode plates 7, 8 and a pair of piezoelectric elements 5, 6 are slightly changed, compared with that in the first and second embodiments. That is, first piezoelectric element 5, first electrode plate 7, second piezoelectric element 6 and second electrode plate 8 are laminated in this order, and all of these are sandwiched between first block 3 and second block 4',4". Various modified forms of the rotor described above may also be applied to the ultrasonic motor shown in FIG. 9. Other structures are the same as those of the foregoing embodiments, and this ultrasonic motor operates in the same manner as the foregoing embodiments.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An ultrasonic motor comprising:
   a stator including piezoelectric elements, the piezoelectric elements being energized by high frequency voltage and generating longitudinal vibration in the stator;
   a rotor including an upper surface and a lower surface, the rotor being rotatably mounted on the stator with its lower surface slidably contacting the stator; and
   a plurality of slits formed on the rotor, the slits being slanted, viewed from the lower surface of the rotor, toward a rotational direction of the rotor.

2. The ultrasonic motor as in claim 1, wherein the slits are formed on a lower half part of the rotor.

3. The ultrasonic motor as in claim 1, wherein the slits are formed on a middle part of the rotor, leaving certain spaces at upper and lower parts of the rotor.

4. The ultrasonic motor as in claim 1, wherein the slits are formed throughout an entire height of the rotor.

5. The ultrasonic motor as in claim 1, wherein the rotor includes an upper block and a lower block, and the slits are formed throughout an entire height of the lower block.

6. The ultrasonic motor as in claim 1, wherein the slits are formed on an upper half part of the rotor.

7. The ultrasonic motor as in claim 1, wherein:
   the slits are formed on a lower part of the rotor, and one side of each slit is perpendicular to the lower surface of the rotor and another side of each slit is slanted toward the rotational direction of the rotor.

8. The ultrasonic motor as in claim 1, wherein the rotor and the stator are assembled with a single through-bolt, so that the rotor is rotatable relative to the stator.

9. An ultrasonic motor comprising:
   a stator including piezoelectric elements, the piezoelectric elements being energized by high frequency voltage and generating longitudinal vibration in the stator;
   a rotor including an upper surface and a lower surface, the rotor being rotatably mounted on the stator with lower surface slidably contacting the stator;
   a plurality of slits formed on the rotor, the slits being slanted, viewed from the lower surface of the rotor, toward a rotational direction of the rotor, and
   a plurality of slanted stator slits formed on the stator.

10. The ultrasonic motor as in claim 9, wherein the slits are formed on a lower half part of the rotor.

11. The ultrasonic motor as in claim 9, wherein the slits are formed on a middle part of the rotor, leaving specified spaces at upper and lower parts of the rotor.

12. The ultrasonic motor as in claim 9, wherein the slits are formed throughout an entire height of the rotor.

13. The ultrasonic motor as in claim 9, wherein the rotor includes an upper block and a lower block, and the slits are formed throughout an entire height of the lower block.

14. The ultrasonic motor as in claim 9, wherein the slits are formed on an upper half part of the rotor.

15. The ultrasonic motor as in claim 9, wherein the slits are formed on a lower part of the rotor, one side of each slit is perpendicular to the lower surface of the rotor and the other side of each slit is slanted toward the rotational direction of the rotor.

16. The ultrasonic motor as in claim 9, wherein the rotor and the stator are assembled with a single through-bolt, so that the rotor is rotatable relative to the stator.

17. An ultrasonic motor comprising:
   a stator including a piezoelectric member, the piezoelectric member being energized by high frequency voltage and generating longitudinal vibration in the stator;
   a rotor including an upper surface and a lower surface, the rotor being rotatably mounted on the stator with lower surface slidably contacting the stator; and
   means, disposed on the rotor, for converting the longitudinal vibration generated in the stator into twisting vibration, wherein:
      the piezoelectric member is composed of a pair of piezoelectric elements and a common electrode plate interposed and laminated between the piezoelectric elements; and
      the piezoelectric elements are made so that a direction of polarization of each element is opposite to each other along a longitudinal axis of the stator.

18. The ultrasonic motor as in claim 17, wherein the converting means is a plurality of slits formed on the rotor, the slits being slanted, viewed from the lower surface of the rotor, toward a rotational direction of the rotor.

19. The ultrasonic motor as in claim 18, wherein the slits are formed on a lower half part of the rotor.

20. The ultrasonic motor as in claim 18, wherein the slits are formed throughout an entire height of the rotor.

21. The ultrasonic motor as in claim 17, wherein the stator and the rotor are assembled with a single through-bolt, so that the rotor is rotatable relative to the stator.

22. An ultrasonic motor comprising:
   a stator including a piezoelectric member, the piezoelectric member being energized by high frequency voltage and generating longitudinal vibration in the stator;
   a rotor including an upper surface and a lower surface, the rotor being rotatably mounted on the stator with lower surface slidably contacting the stator;
   a plurality of slits formed on the rotor, the slits being slanted, viewed from the lower surface of the rotor, toward a rotational direction of the rotor, and
   a plurality of slanted stator slits formed on the stator, wherein:
      the piezoelectric member is composed of a pair of piezoelectric elements and a common electrode plate interposed and laminated between the piezoelectric elements; and
      the piezoelectric elements are made so that a direction of polarization of each element is opposite to each other along a longitudinal axis of the stator.

23. The ultrasonic motor as in claim 22, wherein the slits are formed on a lower half part of the rotor.

24. The ultrasonic motor as in claim 22, wherein the slits are formed throughout an entire height of the rotor.

25. The ultrasonic motor as in claim 22, wherein the stator and the rotor are assembled with a single through-bolt, so that the rotor is rotatable relative to the stator.

* * * * *

UNITED STATES PATENT AND TRADEMARK OFFICE
CERTIFICATE OF CORRECTION

PATENT NO. : 6,166,477
DATED : December 12, 2000
INVENTOR(S) : David Sandelman and Daniel Skprecher It is certified that error appears in the above-identified patent and that said Letters Patent is hereby corrected as shown below:

Title page,
Item [63], In Related U.S. Application Data, second line, after "1999" insert --, and claim priority from provisional application no. 60/115,305 filed January 9, 1999 --;

Column 1,
Line 9, after "1999" insert --, and claims priority from provisional application no. 60/115,305 filed January 9, 1999 --.

Signed and Sealed this

Sixteenth Day of October, 2001

*Attest:*

NICHOLAS P. GODICI
*Attesting Officer*  *Acting Director of the United States Patent and Trademark Office*

UNITED STATES PATENT AND TRADEMARK OFFICE
CERTIFICATE OF CORRECTION

PATENT NO.    : 6,166,477
DATED         : December 26, 2000
INVENTOR(S)   : Masahiko Komoda et al.

It is certified that error appears in the above-identified patent and that said Letters Patent is hereby corrected as shown below:

This certificate supersedes certificate of correction issued October 16, 2001, the number was erroneously mentioned and should be deleted since no certificate of correction was granted.

Signed and Sealed this

Thirtieth Day of July, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.   : 6,166,477
DATED        : December 26, 2000
INVENTOR(S)  : Masahiko Komoda It is certified that error appears in the above-identified patent and that said Letters Patent is hereby corrected as shown below:

<u>Title page,</u>
Item [73], Assignee, please add -- Honda Electronics Co., Ltd., Toyohashi, Japan -- after "Asmo Co., Ltd., Kosai, Japan"

Signed and Sealed this

Twenty-seventh Day of May, 2003

JAMES E. ROGAN
*Director of the United States Patent and Trademark Office*